D. H. Cross,
Filter.

No. 104,432.      Patented June 21, 1870.

Witnesses
Chas. H. Smith
Geo. S. Pinckney

Dan'l. H. Cross
per L. W. Serrell
atty.

United States Patent Office.

DANIEL H. CROSS, OF BENNINGTON, VERMONT.

Letters Patent No. 104,432, dated June 21, 1870.

IMPROVED VIAL FOR FILTERING COLLODION.

The Schedule referred to in these Letters Patent and making part of the same

*To all whom it may concern:*

Be it known that I, DANIEL H. CROSS, of Bennington, in the county of Bennington and State of Vermont, have invented an Improved Filtering Collodion-Vial; and the following is declared to be a correct description thereof.

Vials have been made in which a glass spout has been fitted beneath a removable cover or cap, and provision has been made for allowing any collodion that may drip from said spout to return into the vial. It is, however, usual to allow the surplus collodion to drain off the glass plate into a separate vial, so as to filter the same before it is used.

My invention relates to a filtering-vial in which the filtered collodion is made use of and the surplus collodion returned into the main vessel to be refiltered before being again used upon a plate of glass or other material in photography.

My invention consists in a vial or vessel containing collodion, in which is a pouring-tube, secured at the upper end to a perforated stopper, which stopper also forms a draining funnel, and the bottom of said pouring-tube is provided with a strainer or filter, so that the collodion percolates through the filter into the pouring-tube, and is flowed from that over the plate, and the surplus is drained into the vial through the perforated stopper. A cap is employed to cover the vial to prevent evaporation.

In the drawing—

Figure 1:
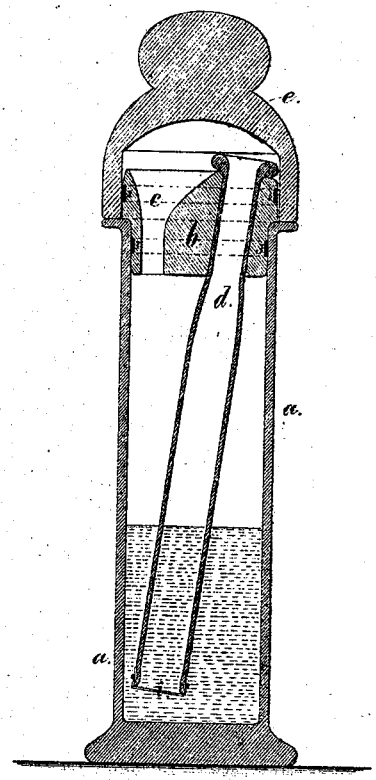
Figure 1 is a vertical section of the said vial, complete.
Figure 2:
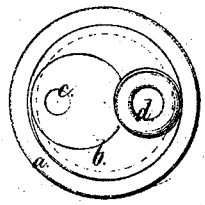
Figure 2 is a plan, with the cap removed.

The vial *a* is of a convenient size and shape. The stopper *b* fits the upper part thereof, and has two openings, one a funnel-shaped hole, *c*, the other an opening for the neck of the pouring-tube *d* to pass through.

I prefer that this pouring-tube *d* should be contracted where it passes through the stopper *b*, in which case it may be necessary to form the stopper in two parts, held together by a winding of wire or string at 2.

An elastic ring, 3, may be employed to form a tight joint between the stopper *b* and vial *a*.

At the lower end of the pouring-tube *d* a filter or strainer is attached, at *i*. The same may be a piece of muslin or flannel, and this prevents the passage into the tube *d* of any foreign substance there may be in the collodion, or which may run in with the same when surplus collodion is drained off the plate into the vial *a* through the funnel *c*.

The cap or cover *e* is made to set over the vial and around the stopper, to prevent evaporation and exclude dust. This cap covers the two openings, and is much more convenient than separate stoppers heretofore used.

The inclined position of the pouring-vial or tube causes the collodion to run from the same, when the vial *a* is inclined, before the collodion reaches the hole *c*; hence nothing will be spilled.

This vial is adapted to varnish, albumen, and other solutions used in photography.

I claim as my invention—

The stopper *b*, having a funnel-shaped opening, *c*, for collodion to be drained off the plate into the vial *a*, in combination with the filtering and pouring-tube *d* and cap *e*, substantially as and for the purposes set forth.

Dated this 25th day of December, A. D. 1869.

DANIEL H. CROSS.

Witnesses:
JAMES B. MEACHAM,
I. T. SHURTLEFF.